United States Patent
Mink et al.

(10) Patent No.: US 6,464,274 B2
(45) Date of Patent: Oct. 15, 2002

(54) SLIDABLE ASSEMBLY WITH INTERLOCKING GUIDE AND ROTATABLE MEMBERS USEFUL FOR MOVABLE MOTOR VEHICLE FLOORS AND EXTENSIONS

(75) Inventors: Franklin L. Mink, Loveland; James C. Coleman, II, Cincinnati, both of OH (US)

(73) Assignee: Mink & Associates, LLC, Loveland, OH (US)

( * ) Notice: Subject to any disclaimer, the term of this patent is extended or adjusted under 35 U.S.C. 154(b) by 0 days.

(21) Appl. No.: 09/784,459

(22) Filed: Feb. 15, 2001

(65) Prior Publication Data

US 2002/0109368 A1 Aug. 15, 2002

(51) Int. Cl.[7] .................................................. B60P 1/52

(52) U.S. Cl. ..................................... 296/26.09; 414/522

(58) Field of Search ....................... 312/354.12, 334.15, 312/334.18, 334.25, 334.26, 334.33, 334.36, 334.37, 334.39; 211/151; 414/522; 296/26.09

(56) References Cited

U.S. PATENT DOCUMENTS

| | | | | |
|---|---|---|---|---|
| 715,681 A | * | 12/1902 | Moyer | 312/334.26 |
| 732,721 A | * | 7/1903 | Dunning | 312/334.26 |
| 937,497 A | * | 10/1909 | Wolf | 312/334.26 X |
| 2,015,389 A | * | 9/1935 | Whitted | 211/151 X |
| 2,678,139 A | | 5/1954 | Gildersleeve | 108/57.15 X |
| 2,809,877 A | * | 10/1957 | Hammesfahr | 312/334.18 X |
| 3,064,836 A | | 11/1962 | Rupert | 414/552 |
| 3,315,973 A | | 4/1967 | Marple | 280/34 |
| 3,453,034 A | * | 7/1969 | Boer | 312/334.18 X |
| 3,471,045 A | * | 10/1969 | Panciocco | 414/522 |
| 3,581,681 A | | 6/1971 | Newton | 108/57.28 |
| 3,726,422 A | | 4/1973 | Zelin | 296/26.09 |
| 3,926,491 A | * | 12/1975 | Greer | |
| 4,023,850 A | | 5/1977 | Tillery | 296/26 |
| 4,231,695 A | * | 11/1980 | Weston, Sr. | 296/35.3 X |
| 4,531,773 A | | 7/1985 | Smith | 296/26 |
| 4,685,857 A | | 8/1987 | Goeser et al. | 414/522 |
| 4,830,242 A | | 5/1989 | Painter | 296/26.09 |
| 4,950,123 A | | 8/1990 | Brockhaus | 296/26.09 X |
| 4,993,088 A | | 2/1991 | Chudik | 296/26.09 X |
| 5,052,878 A | * | 10/1991 | Brockhaus | 414/522 |
| 5,064,335 A | | 11/1991 | Bergeron et al. | 296/26.09 |
| 5,083,830 A | | 1/1992 | Mucher et al. | 296/39.2 |
| 5,090,335 A | | 2/1992 | Russell | 108/44 |
| 5,098,146 A | | 3/1992 | Albrecht et al. | 296/26.09 |

(List continued on next page.)

FOREIGN PATENT DOCUMENTS

DE          2518647     * 12/1976    ............ 312/334.18

*Primary Examiner*—Dennis H. Pedder
(74) *Attorney, Agent, or Firm*—Eric W. Guttag; Smith, Guttag, Hasse & Nesbitt (57) ABSTRACT

An interlocking slidable assembly useful for movable extensible platforms, such as a movable or sliding floor or plate extension used with the rear cargo areas of a motor vehicle such as a pickup truck. This assembly includes a first and second plurality of rotatable members spaced apart along parallel axes that slidably interlock with the guide members of the rail or rails. Each of the rotatable members is rotatable about a substantially vertical rotational axis and slidably engages the respective guide member of the rail or rails. One of the guide members or the rotatable members have a recess in the periphery thereof to slidably receive the other of the guide and rotatable members. Because the rotatable members rotate about vertical axes, there is better and more even distribution of weight on the weight-bearing surfaces that makes it easier for slidable movement and decreases the amount of wear. In addition, because the recesses in the rotatable members (or the guide members) are oriented to open horizontally (rather than vertically), dirt and other debris will have less of a tendency to collect in the recesses and thus inhibit slidable movement.

5 Claims, 9 Drawing Sheets

U.S. PATENT DOCUMENTS

| | | | |
|---|---|---|---|
| 5,456,511 A | 10/1995 | Webber | 296/26 |
| 5,513,941 A | 5/1996 | Kulas et al. | 414/522 |
| 5,544,998 A | 8/1996 | Malinowski | 414/522 |
| 5,564,767 A | 10/1996 | Strepek | 296/26.09 |
| 5,634,408 A | 6/1997 | Jarkowski | 108/44 |
| 5,649,731 A | 7/1997 | Tognetti | 296/26.09 |
| 5,685,593 A | 11/1997 | O'Connor | 296/39.2 |
| 5,700,047 A | 12/1997 | Leitner et al. | 296/26 |
| 5,755,480 A | 5/1998 | Bryan | 296/26 |
| 5,816,637 A | 10/1998 | Adams et al. | 296/26.09 |
| 5,820,190 A | 10/1998 | Benner | 296/26.09 |
| 5,938,262 A | 8/1999 | Mills | 296/26.09 |
| 5,944,371 A | 8/1999 | Steiner et al. | 296/26.09 |
| 6,059,339 A | 5/2000 | Madson | 296/26.01 |
| 6,065,792 A | 5/2000 | Sciullo et al. | 296/26.09 |

\* cited by examiner

SLIDABLE ASSEMBLY WITH INTERLOCKING GUIDE AND ROTATABLE MEMBERS USEFUL FOR MOVABLE MOTOR VEHICLE FLOORS AND EXTENSIONS

TECHNICAL FIELD

The present application relates to an interlocking slidable assembly useful for movable extensible platforms and other movable structural members such as a movable or slidable floor or plate extension for rear cargo areas, such as truck beds and other cargo bed areas, of motor vehicles such as pickup trucks, sport utility vehicles (SUVs), station wagons and vans. The present invention particularly relates to an interlocking slidable assembly having guide members that slidably interlock with rotatable members that rotate about a vertical axis.

BACKGROUND OF THE INVENTION

With the proliferation of compact, mid-size and full-size pickup trucks with short beds, generally ranging from 4 to 6.5 feet in length, there is a limitation on the ability of truck owners to effectively haul longer items typically accommodated by longer beds (e.g., a 4 foot×8 foot sheet of plywood). A similar problem exists with the cargo area of other motor vehicles such as sport utility vehicles (SUVs), station wagons and vans that are also used to haul such items.

Several approaches have been previously suggested to expand the cargo carrying capacity of pickup truck beds and other motor vehicles used to haul various items. One such approach is to use a tailgate extension device to provide a longer bed floor area. See, for example, U.S. Pat. No. 4,023,850 (Tillery), issued May 17, 1977; U.S. Pat. No. 4,531,773 to (Smith), issued Jul. 30, 1985; and U.S. Pat. No. 5,755,480 (Bryan), issued May 26, 1998. While these prior tailgate extension devices do provide for an expanded cargo floor area, the steps necessary for their assembly and regular use are relatively complex. In addition, when not in use as a bed extension, these prior extension devices serve no other beneficial purpose.

A variation of the tailgate extension approach is disclosed in U.S. Pat. No. 5,700,047 (Leitner, et al), issued Dec. 23, 1997, involving a U-shaped truck bed extender 11 that can be rotatably mounted to the side walls of the rear portion of a pickup bed and then rotated inside the bed to serve as a storage/retaining compartment for loaded items or outside the bed onto the lowered tailgate to effectively expand the enclosed cargo area. While retention is provided for cargo items that extend onto the lowered tailgate, this truck bed extender does not truly expand or extend the truck bed or cargo area floor.

Another prior approach to expand the cargo carrying capacity of a pickup truck bed involves slidable assemblies that expand the bed or floor to accommodate larger load items, but can be retracted to a shortened bed length when such capability is not required. See, for example, U.S. Pat. No. 4,950,123 (Brockhaus), issued Apr. 21, 1990; and U.S. Pat. No. 5,816,637 (Adams et al), issued Oct. 6, 1998. While these prior expandable and retractable beds or floors provide for expanded cargo area when needed, their construction and installation is necessarily complex, in that the expansion (and retraction) mechanism is a duplicative element in the manufacture of an entire truck bed.

Still another approach for slidable assemblies used with work benches, plates, floors, beds, tables and the like that are movable within the pickup bed cargo area involves various types and configurations of rollers for ease of slidable movement. See, for example, U.S. Pat. No. 5,090,335 (Russell), issued Feb. 25, 1992; U.S. Pat. No. 5,513,941 (Kulas et al), issued May 7, 1996; and U.S. Pat. No. 6,059,339 (Madson), issued May 9, 2000. For several of these devices, the rollers can be guided or mounted for movement within or along a track, rail or channel. See U.S. Pat. No. 4,993,088 (Chudik), issued Feb. 19, 1991; U.S. Pat. No. 5,098,146 (Albrecht et al), issued May 24, 1992; U.S. Pat. No. 5,456,511 (Webber), issued Oct. 10, 1995; U.S. Pat. No. 6,065,792 (Sciullo et al.), issued May 23, 2000. The rollers for these prior slidable assemblies cited above are mounted for rotation about the horizontal axis. As a result, the weight distribution is uneven in that the primary weight-bearing surface will be at the bottom of each of the rollers. This can make it more difficult to slidably move the bench, plate, floor, bed or table, especially if the bench, plate, floor, bed or table is relatively heavy. In addition, this uneven weight distribution can greatly increase the amount of wear that occurs on the rollers.

Some of these slidable assemblies with guided or mounted roller systems use rollers that have grooves or notches for engaging the guiding rail, track or channel. One such system is disclosed in U.S. Pat. No. 5,649,731 (Tognetti), issued Jul. 22, 1997 and involves a workbench that is supported by rollers 58 and 66 having respective grooves 60 and 68 that receive portions of respective rails 46 and 52. Another such system is disclosed in U.S. Pat. No. 5,938,262 (Mills), issued Aug. 12, 1999 and involves a slidable truck bed extension plate 26 mounted on parallel connecting rails 36 that rotatably mount three pairs of upper and lower rollers 38, 40, each of the rollers having respective wheel well notches 28, 32; each of the pairs of upper and lower rollers 38, 40 are spaced apart to receive a rail 44 supported on truck bed 12 by three spaced rail supports 46. As with the other prior roller systems for slidable assemblies, the notched or grooved roller systems of the Tognetti and Mills patents are mounted to rotate about a horizontal axis. This means that the primary weight-bearing surface will again be the bottom surface of the rollers with the attendant problems of difficulty in moving the workbench or plate if it is relatively heavy and increased wear on the rollers (especially the lower rollers 38 of the Mills system) because of the uneven distribution of weight. In addition, because the rollers rotate about the horizontal axis, the notches or grooves of the Tognetti and Mills roller systems open vertically and are more likely to pick up, collect and accumulate dirt and other debris. This can increase the degree of friction between the rollers and the respective rails, again making it potentially more difficult to slidably move the workbench or plate.

Accordingly, it would be desirable to provide a slidable assembly for a movable extensible platform, plate, floor, bed, table or similar movable structural member useable with pickup truck beds and other cargo areas of motor vehicles used to haul various items that: (1) is of relatively simple construction; (2) permits relatively easy movement of the movable structural member, especially between fully extended and fully stored positions; (3) provides for more even weight distribution to permit relatively easy slidable movement between fully extended and stored positions without excessive wear; and (4) is not prone to accumulating dirt and other debris that can inhibit the ability for easily slidable movement.

SUMMARY OF THE INVENTION

The present invention relates to an interlocking slidable assembly for movable extensible platforms or other movable structural members used with a base member, such as a movable or sliding floor or plate extension used with the rear cargo areas of a motor vehicle. In one embodiment, this assembly comprises:

a. a first and second plurality of rotatable members associated with one of the structural member and the base member;

b. the first plurality of rotatable members being spaced apart along a first longitudinal axis;

c. the second plurality of rotatable members being spaced apart along a second longitudinal axis spaced laterally from and substantially parallel to the first axis;

d. each rotatable member of the first and second pluralities being rotatable about a substantially vertical rotational axis;

e. a guide component associated with the other of the structural member and the base member;

f. the guide component having a first guide member that slidably engages the first plurality of rotatable members and a second guide member that slidably engages the second plurality of rotatable members so that the guide component slidably interlocks with the first and second plurality of rotatable members;

g. one of each of the guide members and each of the rotatable members having a recess in the periphery thereof to slidably receive the other of the guide members and the rotatable members.

In an alternative embodiment of the present invention, this assembly comprises:

a. a plurality of rotatable members associated with one of the structural member and the base member and spaced apart along a longitudinal axis;

b. each rotatable member being rotatable about a substantially vertical rotational axis;

c. a guide component associated with the other of the structural member and having a first guide member and second guide member;

d. one of each of the guide members and each of the rotatable members having a recess in the periphery thereof to slidably receive the other of the guide members and the rotatable members.

e. the first and second guide members being oriented on opposite sides of each rotatable member so as that the guide component slidably interlocks with the plurality of rotatable members.

The above embodiments of the interlocking slidable assembly of the present invention provide a number of advantages over prior slidable assemblies used with movable platforms, floors, plates, beds, tables and similar movable structural members, especially relative to prior slidable assemblies that use rollers that are mounted for rotation about horizontal axes. Because the rotatable members of the present invention rotate about vertical axes, there is a better and more even distribution of weight on the weight-bearing surfaces. This better and more even weight distribution not only makes it easier for slidable movement of the movable structural member, especially from a fully stored to a fully extended position (and vice versa), but can also decrease the amount of wear on the weight bearing surfaces of the rotatable members. In addition, because the recesses in the rotatable members (or the guide members) are oriented to open horizontally (rather than vertically), dirt and other debris will have less of a tendency to collect and accumulate in the recesses and thus inhibit slidable movement.

Other benefits and advantages of the interlocking slidable assemblies of the present invention include:

(a) providing a slidable assembly for use with a variety of movable extensible platforms or other movable structural members such as an integrated sliding floor extension for a truck bed and multiple purpose vehicle cargo area to: (1) increase the utility of shorter beds for hauling longer items; and (2) increase the ease of and access to loading and unloading of items stored in the bed or cargo area, rather than leaning into the bed compartment from the side or rear or into the vehicle cargo area to load or retrieve a cargo item.

(b) providing a slidable assembly that has a relatively simple structure, is relatively easy to operate and is relatively resistant to mechanical malfunction during typical use;

(c) providing a slidable assembly that can integrate the motor vehicle (e.g., pickup truck or multiple purpose vehicle) cargo area with a sliding floor or extension plate to increase the ease of access to cargo, extend the pickup bed load floor, and provide a multifunctional platform for mounting, attaching or otherwise incorporating cargo dividers/restraining devices, toolboxes, coolers, canoe racks or other such items. This can be achieved whether the cargo area is constructed of metal, composite/plastic or a combination of the two. In particular, the slidable assembly of the present invention is especially useful for providing for the bed or cargo area of a motor vehicle (e.g., pickup trucks, vans, SUVs, other passenger vehicles, etc.) a sliding floor or extension to enable the stored or hauled items therein to be easily removed from the rear of the truck or passenger vehicle, as well as to increase the length of the bed/cargo area floor.

DETAILED DESCRIPTION OF THE INVENTION

The present invention can best be understood by reference to the drawings that illustrate various embodiments of the slidable assembly within the scope of the present invention. For illustrative purposes, the embodiments of this interlocking slidable assembly are shown as being used with a movable, extensible platform member in the form of a slidable floor extension plate for a pickup truck bed or similar cargo area such as that of a sport utility vehicle (SUV). However, the slidable assembly of the present invention can be used with a variety of other movable or slidable extensible platforms or other movable support or structural members such as utility trailer floors, loading ramps, all terrain vehicle (ATV) beds, recreational vehicle (RV) storage bins, stereo component racks, marine storage bins and electronic racks, roof carriers, aircraft storage bins, tool box slides, fishing tackle boxes or drawers, food service tray racks, library book shelves, and casket slides, or any other storage bin, rack, box, or shelf that needs slidable access, for a variety of mobile and/or stationary structures, or vehicles.

Figure 1:
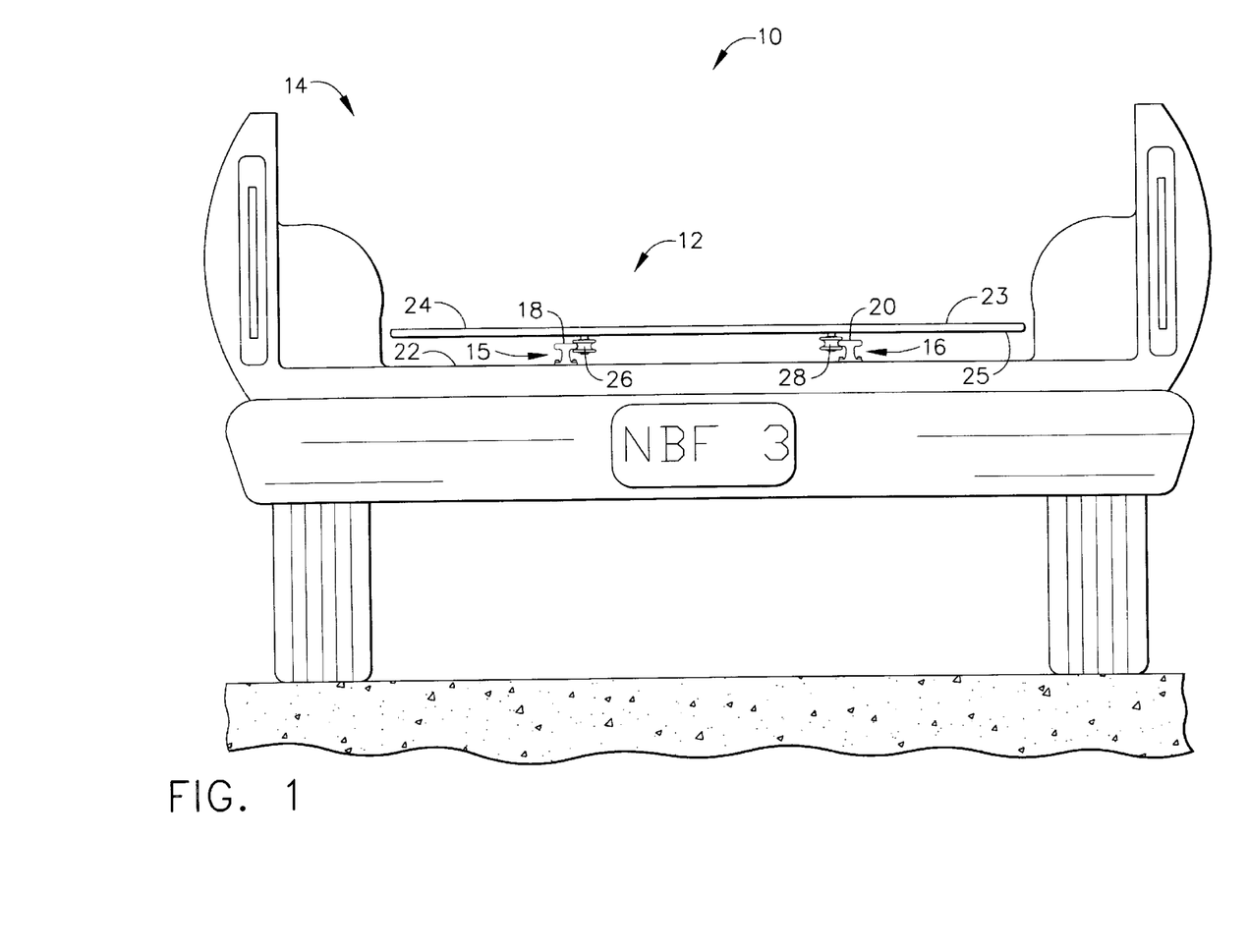
FIG. 1 is a view from the rear end of the cargo bed of a representative pickup truck (without tailgate) showing an embodiment of the slidable assembly of the present invention used with a sliding floor extension plate.
Figure 3:
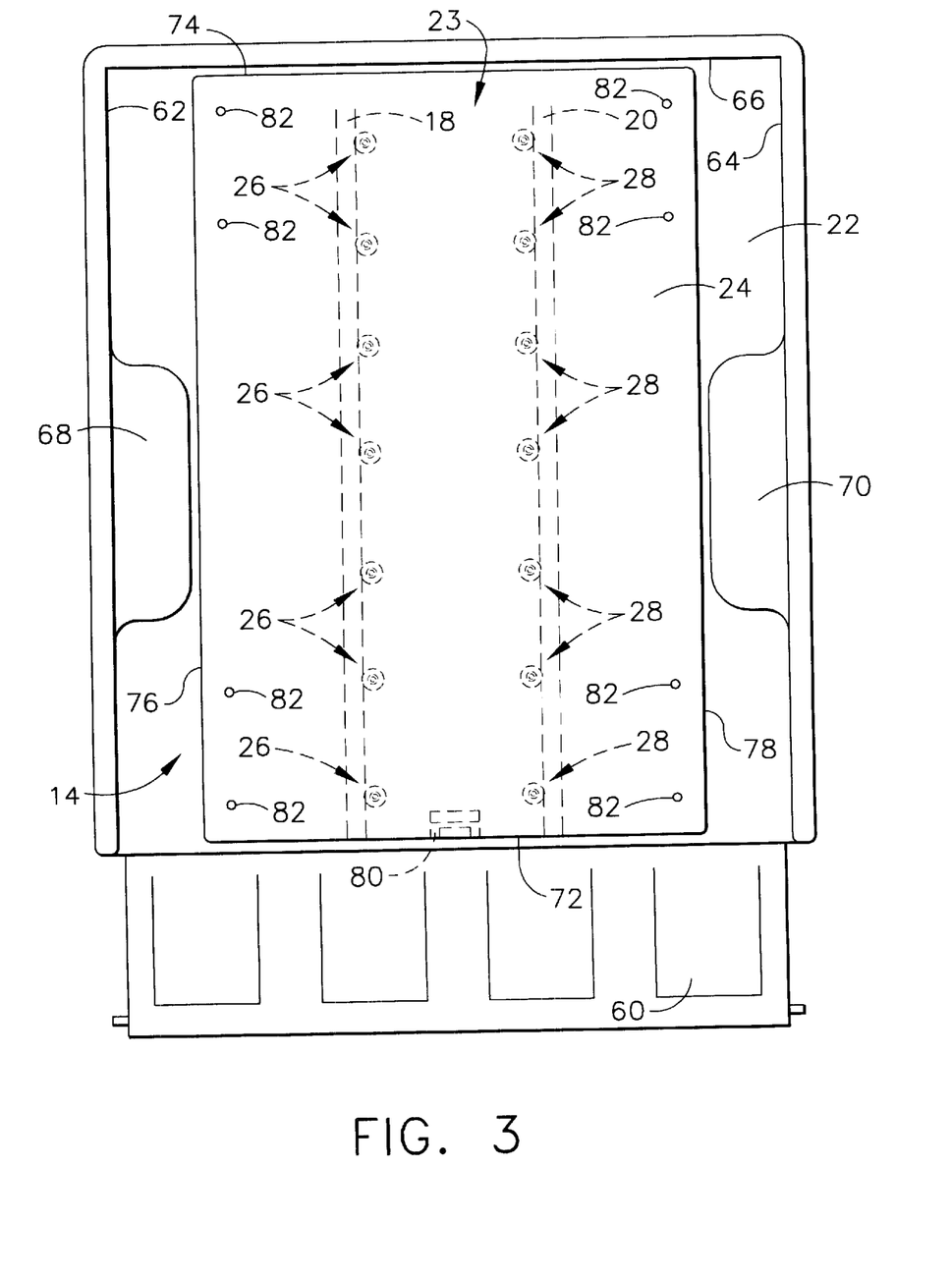
FIG. 3 is a top plan view of the truck cargo bed of FIG. 1 with the tailgate down showing the sliding floor extension plate in a fully stored position.
Figure 4:
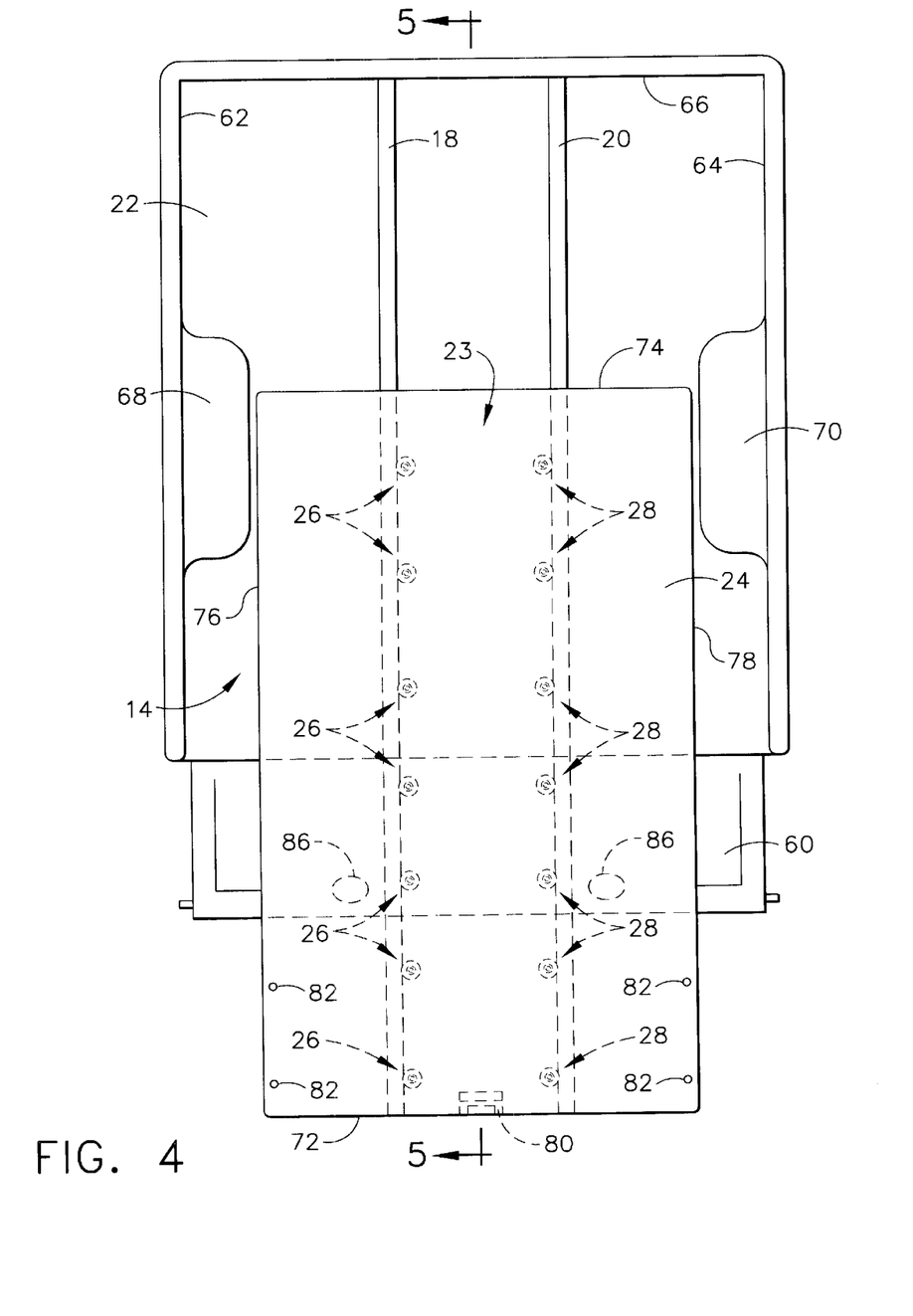
FIG. 4 is a top plan view of the truck cargo bed of FIG. 1 showing the sliding floor extension plate in a fully extended position.

Referring initially to FIG. 1, the slidable assembly of the present invention is shown being used with a motor vehicle such as a pickup truck indicated generally as 10 to provide a sliding load floor extension structure indicated generally as 12 for a truck cargo bed area indicated generally as 14. The slidable assembly of the present invention used in structure 12 is shown in FIG. 1 in the form of a pair laterally spaced apart assemblies or combinations 15 and 16. Left assembly or combination 15 comprises a guide component in the form of a first or left rail 18 that is slidably received by a first or left set comprising a plurality of rotatable members, one of which is shown in FIG. 1 and indicated generally as 26. The other right assembly or combination 16 comprises a guide component in the form of a second or right rail 20 that is laterally spaced apart from rail 18 and is slidably received by a second or right set comprising a plurality of rotatable members, one of which is shown in FIG. 1 and indicated generally as 28. Rails 18 and 20 are shown in FIG. 1 as being associated with the cargo bed floor generally indicated as 22. Rotatable member 26 and 28 are shown in FIG. 1 as being associated with a movable sliding floor extension plate indicated generally as 23 that has a top surface or load carrying side indicated as 24 and a bottom surface or underside indicated as 25. Plate 23 can be made of a lightweight molded composite/plastic material, metal plating (encased or not within a shell of composite materials) or other suitable material and is supported by assemblies 15 and 16 for movement between a fully stored position (as shown in FIG. 3), or a fully extended position (as shown in FIG. 4). While FIG. 1 shows a pair of such slidable assemblies or combinations 15 and 16, it should be understood that assemblies 15 and 16 can also be in the form of one such combination, or can be in the form of a plurality of such combinations where two, three or more of such combinations are used to movably support plate 23.

Rails 18 and 20, as well as rotatable members 26 and 28, can be made from one or more metal and/or composite/plastic materials and can be formed or associated to be integral with one of the cargo bed floor 22 or the floor extension plate 23, such as by molding, stamping or other suitable manner of integration, or can be formed separately from such materials, and then mounted, connected, or otherwise attached to the cargo bed floor 22 or floor extension plate 23 mechanically by bolts. screws or other suitable fasteners, adhesively by glue or Velcro any combination of mechanical or adhesive attachment, or any other suitable manner of attachment. For example, rotatable members 26 and 28 can be mounted on the underside 25 of floor extension plate 23 so that it can be slidably mounted on rails 18 and 20 that are attached to or integral with cargo bed floor 22. Alternatively, rails 18 and 22 can be integral with or attached to the underside 25 of the floor extension plate 20, with rotatable members 26 and 28 being rotatably mounted on cargo bed floor 22. As shown in FIG. 1, assemblies 15 and 16 comprising the rail 18, 20 and rotatable member 26, 28 combinations are typically identical or similar in construction or configuration, although they need not be so.

Figure 2:
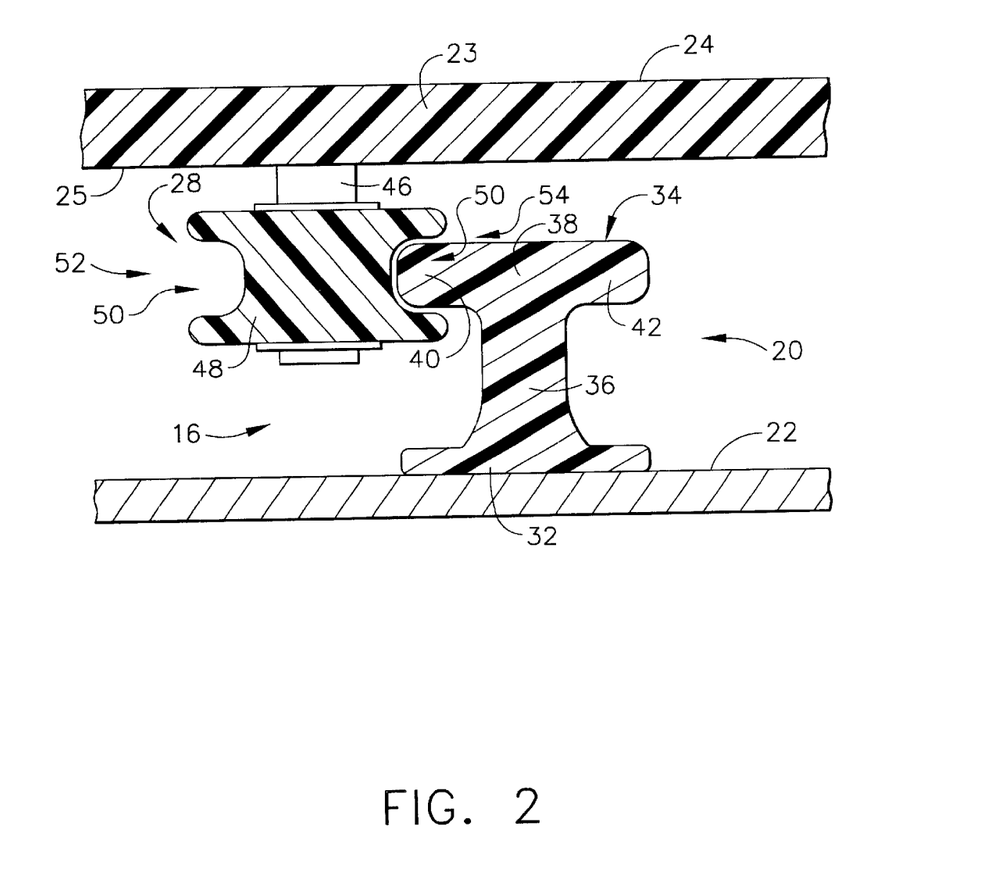
FIG. 2 is an enlarged, sectional view of a portion of the embodiment of the assembly of FIG. 1.

FIG. 2 of the drawings shows in more detail the construction and configuration of assembly or combination 16 with regard to right rail 20 and one such rotatable member of the right set of rotatable members 28. (Left rail 18 will be of similar construction and configuration as right rail 20 and the left set of rotatable members 26 will be of similar construction and configuration as rotatable member 28.) As shown in FIG. 2, rail 20 comprises a lower base segment 32 that is integral with or otherwise attached to cargo bed floor 22 and an upper generally T-shaped guide segment 34. T-shaped guide segment 34 comprises a lower neck portion 36 connected at one end to base segment 32 and an upper head portion 38 connected to neck portion 36 at the other end thereof. Head portion 38 of guide segment 34 includes an outwardly extending left guide member 40 and an opposite outwardly extending right guide member 42. As further shown in FIG. 2, rotatable member 28 comprises a cylindrical shaft 46 that is mounted on or otherwise attached to underside 25 of plate 23 and a generally circular or cylindrical wheel or roller 48 that is mounted on shaft 46 for rotation about a substantially vertical axis. Roller 48 has formed in the periphery or circumference thereof a recess in the form of a generally circular notch or groove 50. The left side of groove 50 (and roller 48) is indicated generally as 52, while the opposite and right side of groove 50 (and roller 48) is indicated generally as 54.

As shown in FIG. 2, left guide member 40 is configured and sized to slidably fit within groove 50 that opens outwardly on the right side 54 of roller 48. (For rail 18, guide member 42 would slidably fit within groove 50 as it opens outwardly on the left side 52 of roller 48.) So that guide member of 40 (or 42) of rail 20 (or 18) can easily and slidably move within groove 50 of roller 48, it is preferred that the surface of guide member 40 (or 42) and the surface of groove 50 should comprise materials that provide, in combination, a relatively low coefficient of friction therebetween, and preferably impart additional properties such as relatively high resistance and corrosion resistance. As used herein, the term "a relatively low coefficient of friction" usually refers to a coefficient of friction (both static and dynamic when lubricated) of about 0.1 or less. The surfaces of guide member 40 (or 42) and groove 50 can be provided with a combined relatively low coefficient of friction by coating, spraying, dipping adhering, or otherwise applying materials having such a combined relatively low coefficient of friction to such surfaces only, by making guide segment 34 of rail 20 (or 18) and roller 48 from such materials, or by simply making rail 20 (or 18) and roller 48 entirely from such materials. Suitable combinations of materials that provide a relatively low coefficient of friction therebetween are combinations of a metal such as aluminum, stainless steel, bronze, brass, copper, cadmium, chromium, tungsten carbide, zinc, magnesium, and alloys thereof on one of the surfaces of rail 20 (or 18) and roller 48, with a relatively low coefficient of friction polymer such as ultra high molecular weight polyethylene (e.g., TIVAR brand name ultra high molecular weight polyethylene such as TIVAR 1000 manufactured by Poly Hi Solidur) or polytetrafluoroethylene (e.g.,Teflon) on the other surface, combinations of a plastic such as nylon, on one of the surfaces, with a relatively low coefficient of friction polymer on the other surface, or combinations of a relatively low coefficient of friction polymer on both surfaces. Particularly preferred combinations involve using ultra high molecular weight polyethylene for making all or at least the surfaces of rail 20, and nylon or more preferably aluminum in making roller 48.

The operation of the interlocking slidably assembly 12 for supporting plate 23 so that it is movable horizontally from a first position (e.g., fully stored) to a second position (e.g. fully extended) can best be understood by reference to FIGS. 3 and 4. Referring to FIGS. 3 and 4, the cargo area 14 of pickup truck 10 is shown with tailgate 60 in a lowered configuration. FIGS. 3 and 4 also show cargo area 14 of truck 10 as having a left side wall 62, a right side wall 64 opposite and spaced laterally from side wall 62, and a forward end or wall 66 spaced laterally from and opposite tailgate 60. Also shown in FIGS. 3 and 4 are a left wheel well 68 and a right wheel well 70 formed in cargo bed floor 22 which is otherwise typically a substantially planar surface. Plate 23 is shown as having a rectangular configuration and includes a rear or back end 72, a front or forward end 74 opposite and spaced laterally from end 72, a left side or edge 76 opposite side wall 62, a right side or edge 78 spaced laterally from side 76 and opposite side wall 64. As shown in FIGS. 3 and 4, the width of plate 23 from left side 76 to right side 78 is preferably such that plate 23 can fit between wheel wells 68 and 70. While plate 23 is shown as having a rectangular configuration, other configurations that fit between wheel wells 68 and 70 are also suitable.

As particularly shown in FIG. 3, when plate 23 is in a fully stored position, the length of plate 23 from back end 72 to forward end 74 is such that plate 23 fits within the cargo area 14 defined by the forward end of tailgate 60, side walls 62 and 64 and forward wall 66. Plate 23 is also preferably provided with a handle 80 at rear end 72 so that plate 23 can be gripped for ease of movement within cargo bed 14. As also shown in FIGS. 3 and 4, plate 23 can optionally include other components that will allow the truck bed or cargo area to be divided into compartments or to mount, attach or otherwise include containers or other items in the truck bed or cargo area such as a plurality of molded or drilled peg-receiving holes or apertures indicated as 82 for mounting cargo dividers or other restraining devices, specialized containers, toolboxes, and the like.

Figure 5:
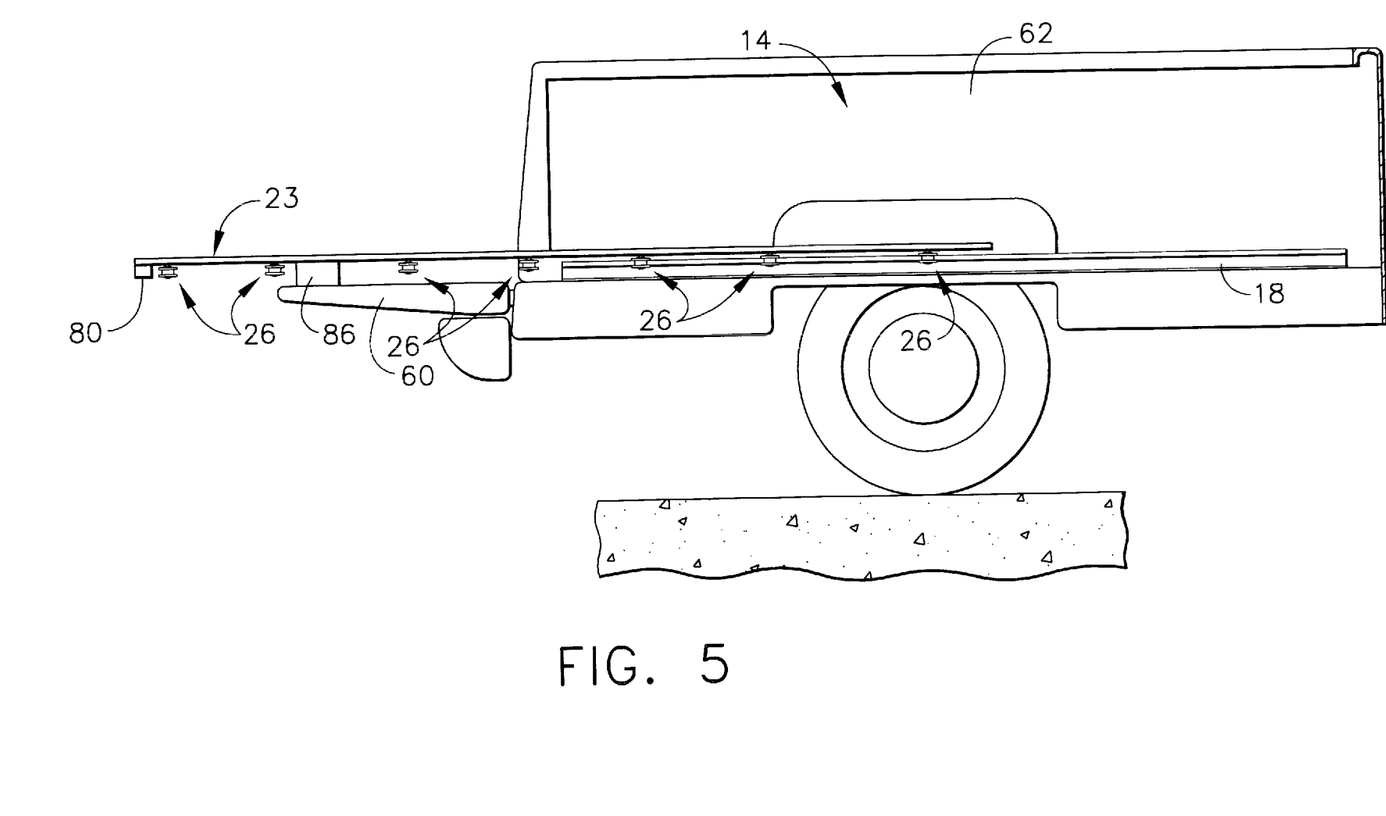
FIG. 5 is a sectional view taken along line 5—5 of FIG. 4.

As also shown in FIGS. 3 and 4, the first set of rotatable members 26 are spaced apart along a first axis substantially parallel to side 76 of plate 23 to slidably receive elongated rail 18 that is substantially parallel to side wall 62, while the second set of rotatable members 28 are spaced apart along a second axis spaced laterally from and substantially parallel to the first axis of rotatable members 26 and side 78 of plate 23 to slidably receive elongated rail 20 that is substantially parallel to side wall 64. While FIGS. 3, 4 and 5 show seven rotatable members for each set 26 and 28, the particular number of rotatable members can vary depending on the length of plate 23 that is being supported, and like factors, and also need not be the same number for each set, so long as each set 26 and 28 has a plurality of rotatable members. e.g., two, three or more rotatable members.

The spacing between the sets of rotatable members 26 and 28, and rails 18 and 20, is such that assemblies 15 and 16 together provide an interlocking combination or fit (i.e., the guide members 40 or 42 remain within grooves 50 of the rotatable members) yet allow for plate 23 to be easily and slidably moved from one position to another within cargo area 14. As shown in FIGS. 3 and 4, the sets of rotatable members 26 and 28 are positioned on the inside of rails 18 and 20. However, if desired, the sets of rotatable members 26 and 28 can be positioned on the outside of rails 18 and 20, or one set of rotatable members 26 or 28 can be positioned on the outside of one of the rails while the other set of rotatable members 26 or 28 is positioned on the inside of the other rail, so long as assemblies 15 and 16 together provide an interlocking combination that allows for easy and slidable movement of plate 23 from one position to another within cargo area 14. As shown in FIGS. 4 and 5, when plate 23 is fully extended past lowered tailgate 60, it can be supported by or rest on supports or pads 86 made from metal and/or composite materials that are fastened or otherwise attached to, or preferably molded/stamped/formed or otherwise made integral with, the inner surface of tailgate 60.

Figure 6:
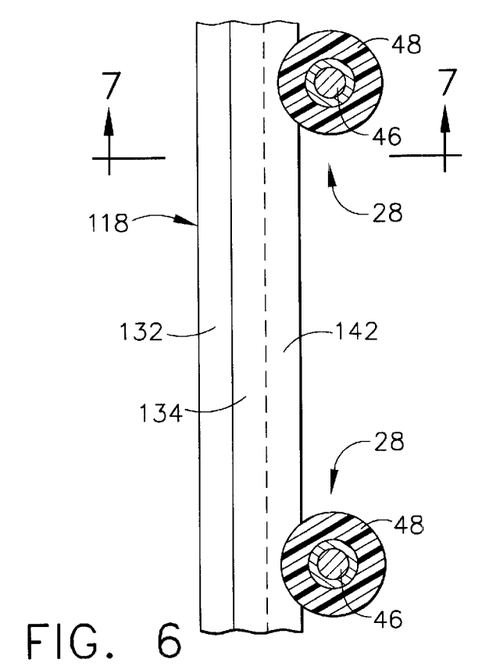
FIG. 6 is a top plan view of an alternative embodiment of the assembly of FIGS. 1 and 2.
Figure 7:
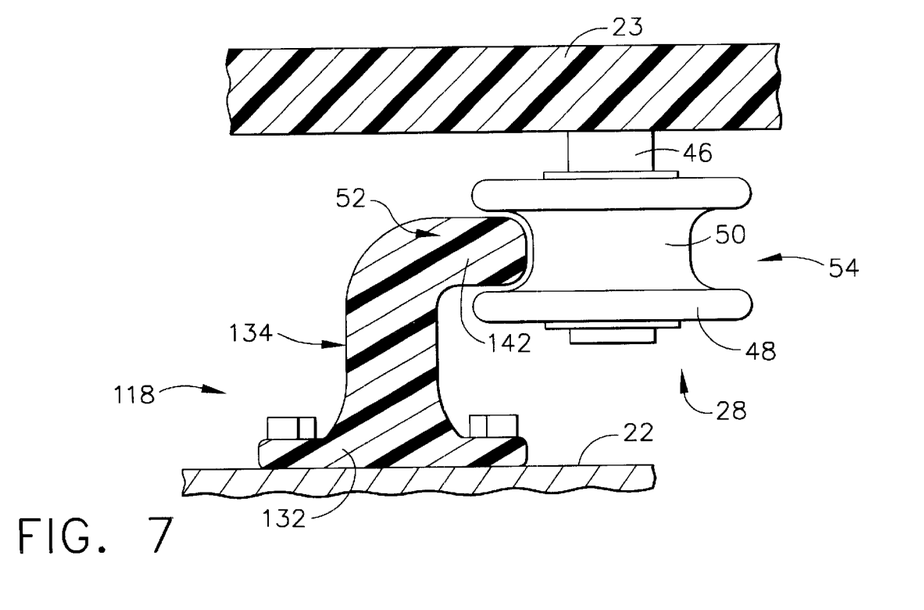
FIG. 7 is an enlarged sectional view taken along line 7—7 of FIG. 6.

An alternative embodiment of the interlocking slidable assembly of the present invention is shown in FIGS. 6 and 7. As shown in FIG. 6 and especially FIG. 7, the guide component can be in the form of a generally L-shaped rail 118 that has a lower base segment 132 attached to or integral with cargo bed floor 22 and an upper generally L-shaped guide segment 134 that includes outwardly extending guide member 142. As shown in FIG. 7, guide member 142 is again configured to fit and slide within the left side 52 of outwardly opening groove 50 of roller 48.

Figure 8:
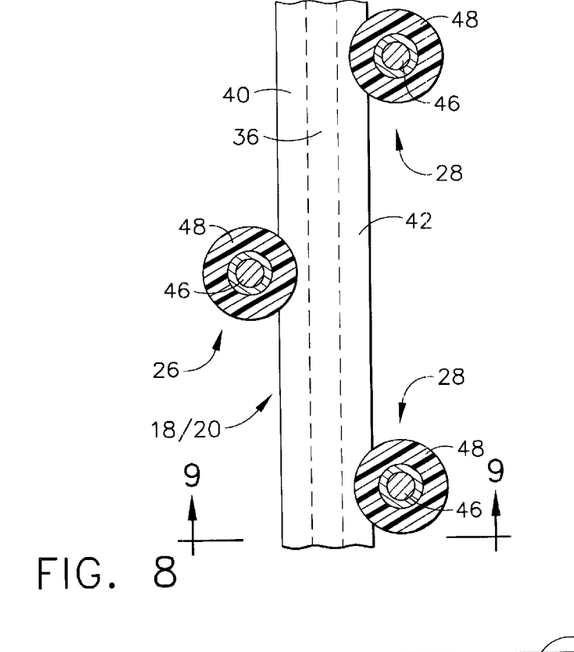
FIG. 8 is a top plan view of an alternative embodiment of the assembly of FIGS. 1 and 2.
Figure 9:
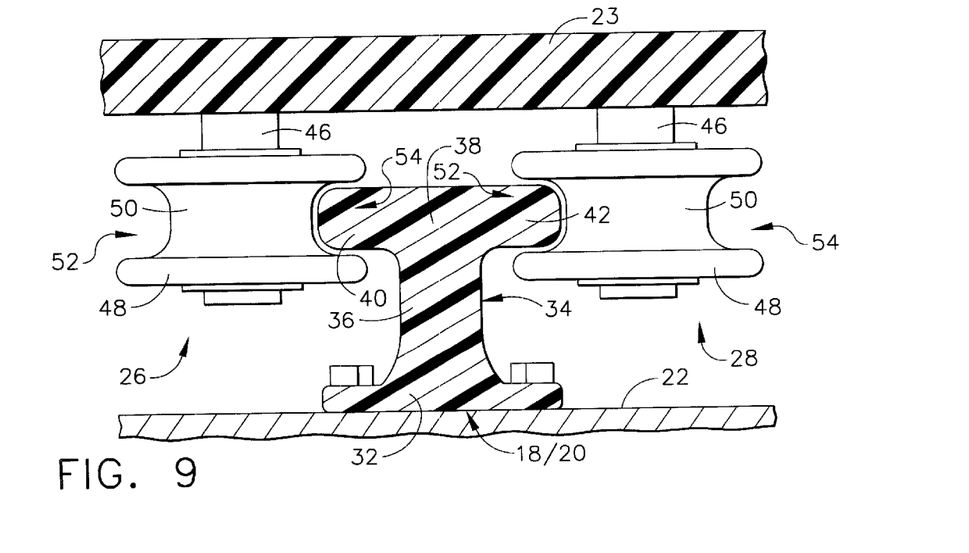
FIG. 9 is an enlarged sectional view taken along line 9—9 of FIG. 8.

Another alternative embodiment of the interlocking slidable assembly of the present invention is shown in FIGS. 8 and 9. As shown especially in FIG. 8, rotatable members 26 and 28 are positioned on either side of rail 18 or 20. As also shown in FIG. 8, rotatable members 26 and 28 can also be spaced along their respective longitudinal axes in an offset or staggered configuration, i.e., each rotatable member 26 is not directly opposite a rotatable member 28. (The rotatable members 26 and 28 shown in the embodiment FIGS. 3 and 4 can also be spaced along the respective longitudinal axes in the same or a similar offset or staggered configuration.) Alternatively, and as shown in FIGS. 3 and 4, each rotatable member 26 can be paired directly opposite a rotatable member 28. The spacing between rotatable members 26 and 28 is such that guide members 40 and 42 of rails 18 or 20 can fit and slide within the outwardly opening grooves 50 of the respective rollers 48. Positioning rotatable members 26 and 28 on either side of rail 18 or 20 can provide additional stability for supporting plate 23 (e.g., rotatable members 26 and 28 can be positioned on each side of rails 18 and 20) and can also potentially permit the use of a single rail 18 or 20 for supporting plate 23 in an interlocking yet easily slidable configuration. In an alternative embodiment to that shown in FIGS. 8 and 9, the configuration of rotatable members and rails could be reversed, with rails 18 and 20 spaced laterally apart and positioned and oriented on either side of a single set of rotatable members 26 (or 28) to provide another suitable slidably interlocking combination.

Figure 10:
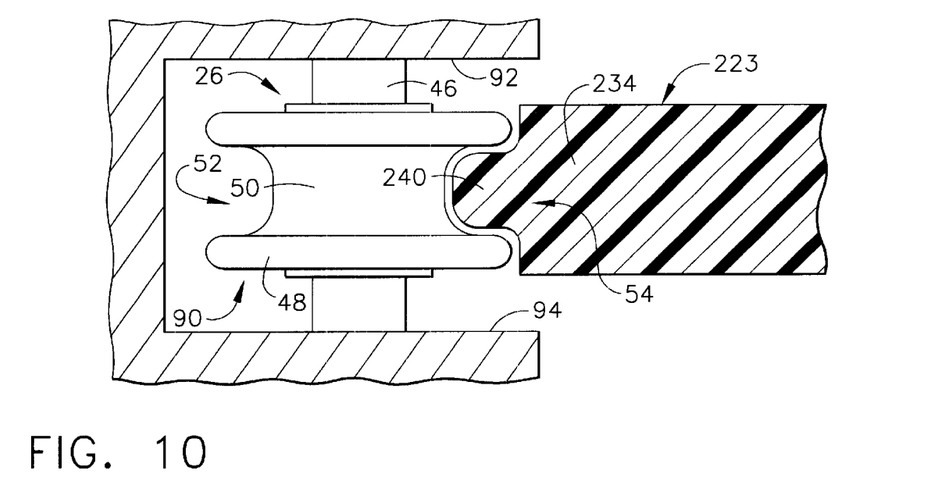
FIG. 10 is a side sectional view of a portion of an alternative embodiment of the slidable assembly of the present invention where the rollers are rotatably mounted within the sidewalls of the cargo bed area of the pickup truck.

Another alternative embodiment of the interlocking slidable assembly of the present invention is shown in FIG. 10 where the rotatable members 26 can be rotatably mounted within recesses 90 in side wall 62 of cargo area 14, with rotatable members 28 being rotatably mounted similarly within similar recesses in side wall 64. As shown in FIG. 10, shaft 46 (on which roller 48 rotates) is vertically mounted within recess 90 and is connected at its upper end to upper surface 92 of recess 90 and at its lower end to lower surface 94 of recess 90 so that roller 48 can be rotatably mounted thereon and rotate with recess 90. As also shown in FIG. 10, sliding extension floor plate 223 has formed integral therewith a guide segment 234. A guide member in the form of a ridge 240 is formed in and protrudes outwardly from guide segment 234 and is configured to fit and slide within the outwardly opening groove 50 of roller 48. A similar guide member (not shown) can be provided on the right side of plate 223. Alternatively, the rotatable members and rails could be reversed, with rails 18 and 20 being mounted on side walls 62 and 64, respectively, with rotatable members 26 and 28 being mounted on plate 23 proximate the respective sides 76 and 78.

Figure 11:
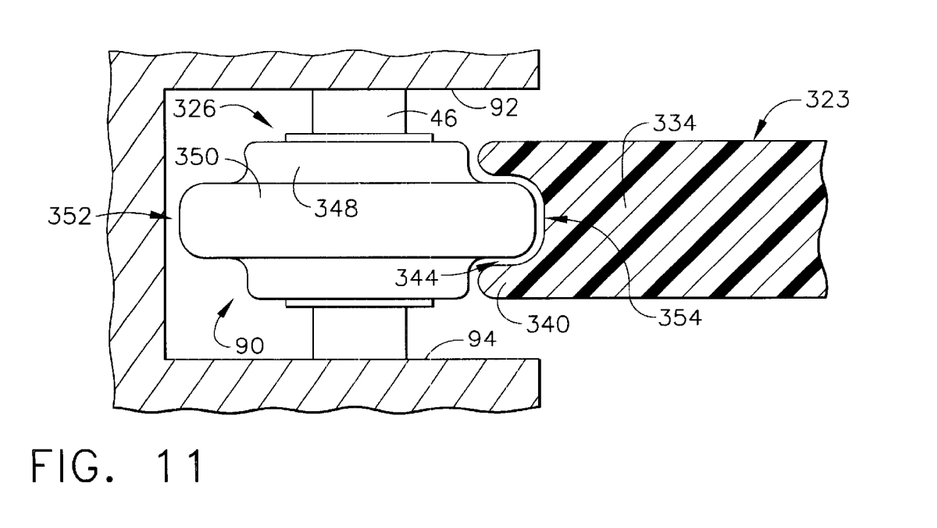
FIG. 11 is a side sectional view of an alternative embodiment of the assembly shown in FIG. 10.
Figure 12:
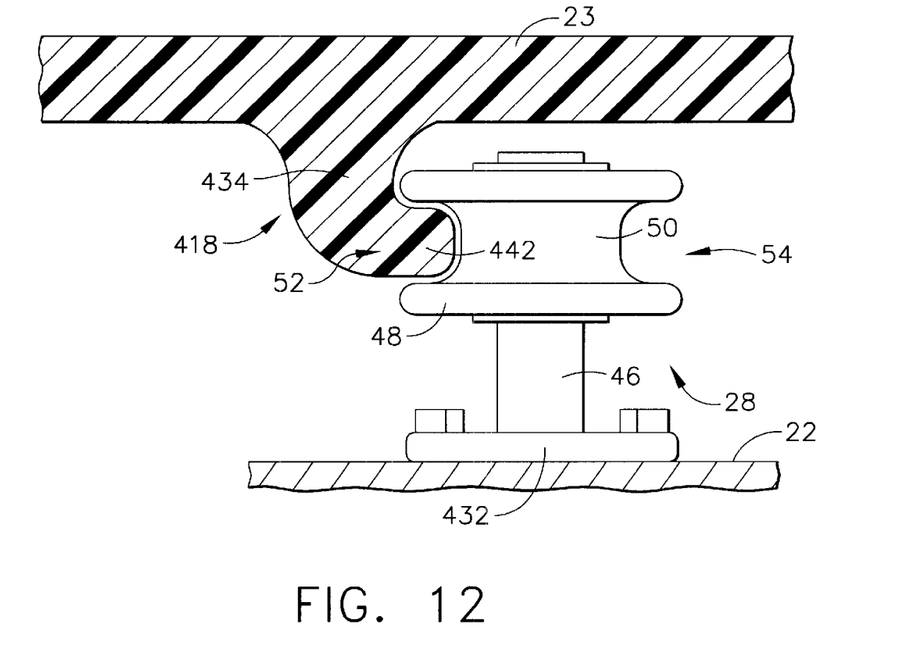
FIG. 12 is a side sectional view of a portion of another alternative embodiment of the slidable assembly of the present invention where the rollers are rotatably mounted on the cargo bed floor and the guide members are integral with the sliding plate.

An alternative embodiment of the assembly of FIG. 10 is shown in FIG. 11. As shown in FIG. 11, rotatable member 326 comprises a roller 348 that is rotatably mounted on shaft 46. Roller 348 has an annular ridge 350 formed therein that protrudes outwardly from the periphery of roller 348 proximate the middle thereof on the left side of roller 348 (as indicated by 352) and on the right side of roller 348 (as indicated by 354). Sliding extension floor plate 323 is shown as being formed integral with a guide segment 334, with guide segment 334 having a guide member 340 at the peripheral edge thereof. Guide member 340 has an outwardly opening recess or slot 344 formed in the periphery thereof that is configured so that right side 354 of ridge 350 of roller 348 can fit within slot 344, so that guide member 340 is slidable along ridge 350. A similar guide member (not shown) can provided on the right side of plate 323 that can also have a similar slot formed in the periphery thereof that is configured so that the left side 352 of ridge 350 of roller 348 can fit within this slot so that this right guide member is slidable along ridge 350.

As shown by the foregoing detailed description, the present invention provides for a slidably interlocking assembly for movable platforms or other movable structural members that can be used with a variety of mobile and stationary structures and in particular with the cargo area of motor vehicles to provide an integrated sliding floor extension that can be pushed forward into a fully stored, non-extended position or pulled rearwardly to a fully extended position past the lowered tailgate of pickup truck or the opening of the cargo area of other motor vehicles such as an SUV to allow for ease of access to load or unload items and/or to accommodate oversized load items. It should also be noted that the specific embodiments of the present invention that are described therein are to be considered illustrative and exemplary of the present invention, are subject to variations in structure, design, application and methodology and are therefore not to be limiting in scope of the present invention. Accordingly, it will be apparent to those skilled in the art that various modifications thereto can be made without departing from the spirit and scope of the present invention as defined in the appended claims.

What is claimed is:

1. A slidable extensible platform for use with a motor vehicle cargo area having a cargo bed, which comprises:

a. a platform member;
   b. a first and second plurality of rotatable members associated with one of the platform member and the cargo bed;
   c. the first plurality of rotatable members being spaced apart along a first longitudinal axis;
   d. the second plurality of rotatable members being spaced apart along a second longitudinal axis spaced laterally from and substantially parallel to the first axis;
   e. each rotatable member of the first and second pluralities comprising a vertical shaft and a roller rotatably mounted on the shaft and having a periphery;
   f. a guide component associated with the other of the platform member and the cargo bed;
   g. the guide component having a first guide member that slidably engages the rollers of the first plurality of rotatable members and a second guide member and that slidably engages the rollers of the second plurality of rotatable members so that the guide component slidably interlocks with the first and second plurality of rotatable members;
   h. one of each of the periphery of the guide members and the periphery of each of the rollers having a groove formed therein to slidably receive the other of the guide members and the rollers.

2. The platform of claim 1 wherein the guide component comprises a pair of laterally spaced apart rails, each of the rails having an L-shaped or T-shaped guide segment including one of the guide members.

3. The platform of claim 1 wherein the periphery of each roller has a recess in the form of a generally circular groove.

4. The platform of claim 3 wherein each of the guide members comprises a ridge protruding outwardly from the guide component and being slidably received by the groove in the periphery of the rollers of at least one of the first and second plurality of rotatable members.

5. The platform of claim 1 wherein the cargo bed has a pair of laterally spaced apart side walls, one of the side walls having recesses therein to receive and mount each shaft of the first plurality of rotatable members so that the roller mounted on each shaft can rotate within the one side wall recess, the other side wall having recesses therein to receive and mount each shaft of the second plurality of rotatable members so that the roller mounted on each shaft can rotate within the other side wall recess, the platform member having a pair of sides, each side being opposite one of the side walls, and wherein the guide component comprises a pair of guide segments, one guide segment associated with each side of the platform member and having one of the guide members extending outwardly therefrom, one of the guide members slidably engaging the rollers rotatably mounted within the recesses of the one side wall, the other guide member slidably engaging the rollers rotatably mounted within the recesses of the other side wall.

* * * * *